2,873,240
PREPARATION OF GRAFT COPOLYMERS

Mary L. Miller, New York, N. Y., assignor to American Cyanamid Company, New York, N. Y., a corporation of Maine No Drawing. Application August 22, 1956
Serial No. 605,472

14 Claims. (Cl. 204—158)

This invention relates to the copolymerization of unsaturated vinyl type monomers. More particularly, the invention relates to a process of making graft copolymers by subjecting to photolysis a polymer containing a minor amount of α-chloroacrylonitrile uniformly integrated within the polymer and graft copolymerizing on the polymer molecules dissimilar monomers.

Copolymerization of monomers is generally accomplished by mixing the monomers in the desirable ratio and subjecting the resulting mixture to polymerizing conditions. The monomers usually unite in a more or less random fashion and the resulting polymer is made up of molecules of substantially homogeneous random structural arrangements which vary considerably in molecular weight. These copolymers, due to the random arrangement of the monomer units in the molecules, fail to impart the more desirable properties of their corresponding homopolymers.

The grafted copolymers prepared according to the process of the present invention are substantially different both in structure and in physical properties from random copolymers. Grafted copolymers provide a molecular structure consisting of polymeric chains of one or more monomers attached to a polymeric molecule of different chemical compositions, i. e. a chain of a monomer or monomers is attached chemically to a polymeric molecule or different chemical composition. The term "graft copolymer" signifies a polymeric product made up of a backbone chain of polymer to which one or more chains of polymer made from a dissimilar monomer are attached. Graft copolymers yield materials which have novel properties not found in either of the individual components.

According to the invention vinyl type monomers are copolymerized with relatively minor amounts of α-chloroacrylonitrile to form copolymers, with chlorine atoms distributed along the molecule, which are then used as a starting material for the preparation of graft polymers.

Polymerization of the initial compound with small amounts of α-chloroacrylonitrile may be conducted by any of the methods conventionally employed in the prior art to form the backbone chain polymer to which grafts are added. For example, the polymerization may be performed in nonaqueous solution or aqueous or nonaqueous dispersion or in the presence of a suitable salt. This polymer is subsequently separated, dissolved in a suitable solvent and mixed with monomer or a mixture of monomers to be grafted. The mixture is subjected to ultraviolet or other actinic radiation to initiate polymerization and to form the graft polymer.

It is an object of the present invention to provide a process for producing graft copolymers of vinyl type monomers which have a relatively high molecular weight. Other objectives and advantages of the invention will become apparent from the detailed description given hereinafter.

The process of the invention is based upon the discovery that when aliphatic vinyl monomers having a polymerizable $CH_2=C<$ group are copolymerized with relatively minor amounts of α-chloroacrylonitrile to form a copolymer, chlorine atoms are distributed along the molecule. The theory is not certain but it is believed that when the above polymers, i. e. the backbone polymer, are exposed to ultraviolet light, or other actinic radiation the chlorine atoms are knocked off of the molecule and active centers are formed at the point of release of the chlorine atoms. Copolymerization with a dissimilar polymerizable vinyl monomer then takes place at these points on the backbone polymer. The distribution of these points results in a similar distribution of grafts of the dissimilar monomer on the backbone. α-Chloroacrylonitrile offers especial advantages for this grafting because the chlorine atom is sensitized to the action of light by the presence of the —CN group on the same carbon. Furthermore the copolymers of α-chloroacrylonitrile are sufficiently stable towards ordinary laboratory procedures to enable them to be dissolved, precipitated or stored without decomposition.

The process of the invention provides advantages over the direct bromination of polymer which introduces a group into the polymer molecule which, although reactive to light, renders the polymers unstable in the ordinary laboratory treatments such as when in solution, when precipitating, or when in storage.

In the polymerization procedure according to the invention the initial monomer is reacted with α-chloroacrylonitrile preferably until there is substantially no unpolymerized monomer present in the reaction. This may be accomplished by conducting the polymerization until substantially all of the monomer has been polymerized or alternately the polymerization may be interrupted at an intermediate stage and substantially all of the unpolymerized monomer removed from the mixture by conventional means. Reaction temperatures ranging from about −70° C. to about 100° C. may be used. The polymer is then dissolved in a suitable solvent together with either a dissimilar polymerizable vinyl monomer or a mixture of two or more of these different monomers may be added. The mixture is then subjected to a photolysis reaction and thereafter polymerized to effect grafting on the polymer of the dissimilar monomer. Monomers which may suitably be employed in preparing the initial polymer with α-chloroacrylonitrile are those selected from the group consisting of compounds having the general formulas

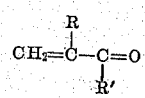

and

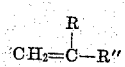

wherein R is a substituent selected from the group consisting of hydrogen and —$CH_3$ and $C_2H_5$ radicals; R' is a substituent selected from the group consisting of hydrogen, —$NH_2$, —OH, —$OCH_3$ and —$OC_2H_5$ radicals; and R'' is a substituent selected from the group consisting of

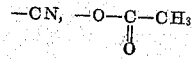

and

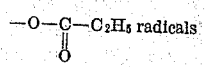

Examples of compounds within the general formula are such as acrylamide, methacrylamide, acrylonitrile, methacrylonitrile, acrylic acid, methacrylic acid, methyl methacrylate and ethyl methacrylate, vinyl acetate, vinyl propionate and the like.

Examples of suitable monomers which may be graft copolymerized are those containing a polymerizable $CH_2=C<$ group and a boiling point of at least 60° C. Suitable monomers within this classification are those enumerated above and in addition includes monomers containing the phenyl radical such as styrene, methyl and dimethyl ring substituted styrenes, ethyl and diethyl ring substituted styrene, and mono and di-halo ring substituted styrenes and heterocyclic monomers such as vinyl pyridine and substituted vinyl pyridines, e. g. 2-methyl vinyl pyridine and 2-ethyl vinyl pyridine.

The term "photolysis," as employed in the present invention, relates to the production of chemical change by light radiations and particularly by light in the ultraviolet and visible region of the spectrum.

The period of exposure to the light to effect photolysis of the polymer containing α-chloroacrylonitrile may vary over a considerable range. When the process is operated in a continuous manner wherein the monomers are allowed to flow past a series of quartz light bulbs the initial period of exposure will only be a matter of a few minutes, e. g., 1 to 3 minutes. In a static operation, however, where light of a smaller intensity will generally be utilized the period of exposure will be much longer, e. g. 25 minutes to 5 hours.

The temperature employed during the initial exposure to the light may vary over a very wide range. Many of the monomers are not thermally polymerizable and in those cases the process will be relatively independent of the temperature employed. In the thermal polymerization of monomers which can be thermally polymerized extremely high temperatures should be avoided as they give rise to undesirable bulk polymers. In general, temperatures between 0° C. and 100° C. give satisfactory results. The exact temperature to be employed may best be determined for each individual case by a few routine determinations.

The polymerization according to the invention is conducted in water or in an aqueous salt solution of alkali metal perchlorates or thiocyanate, such as sodium, potassium and lithium perchlorates or thiocyanates or in an organic solvent such as benzene, toluene, etc. although other known polymerization mediums may suitably be employed.

Polymerization catalysts are not essential to the success of the process and are preferably omitted but may be utilized if desired. When catalysts are employed they should be utilized in relatively small concentrations as high catalyst concentrations lead to the formation of ungrafted homopolymer. Examples of the polymerization catalyst that may be employed are the peroxides, such as benzoyl peroxide, acetyl peroxide, hydrogen peroxide, tert-butyl peroxide; the per-acids, such as persulfuric acid, peracetic acid, and perphthalic acid; the per-esters, such as tert-butyl perbenzoate, and the like. Mixtures of catalysts may also be used. The amount of catalyst in general, should not exceed 1.5% by weight of the monomer being polymerized but the exact amount of catalyst that can be tolerated in the process may be calculated for each individual case by a few routine determinations.

The polymers produced by the process of the invention have a high molecular weight and contain grafts distributed on the molecule. These polymers have higher softening points than random copolymers having the same mole ratio of the component monomers. They are particularly useful in the producing of fibers and as agents in the settling of sludges, ores, and as additives to paper and in soil conditioners. They may be readily molded to produce resins having many superior properties such as tensile strength, hardness and the like. In order to more fully illustrate the process of the invention the following examples are given. It is understood that the examples are for purposes of illustration only and are not to be regarded as limiting the invention except as specified in the appended claims.

Example 1

0.5 part of α-chloroacrylonitrile-acrylonitrile copolymer containing 1.5% chlorine is dissolved in 50 parts of an aqueous solution containing 70% sodium perchlorate (50% sodium thiocyanate may also be used) and 30% of water to which 2 parts of acrylamide is added. The solution is irradiated under a G. E. sunlamp in a quartz tube for 1¼ hours with periodic cooling. The product is poured into methanol and the precipitate is extracted twice with hot water; twice with hot dimethyl formamide; and twice again with hot water. The undissolved residue (the graft copolymer) contains 40 mole percent polyacrylonitrile and 60 mole percent polyacrylamide as determined by infrared examination. The polymer is insoluble in water and in dimethyl-formamide, but soluble in dimethyl sulfoxide and in 50% sodium thiocyanate or 70% sodium perchlorate. Evaporation of the dimethyl formamide solubles gave no residue. Evaporation of the water solubles gave salt and a little polymer from which, after dialysis, 0.023 part of polyacrylamide was recovered.

Example 2

0.5 part of polyacrylamide containing 1.5 percent copolymerized α-chloroacrylonitrile was dissolved in 25 parts of boiled water. One part of acrylic acid was added and the solution photolyzed for one hour and 25 minutes in a quartz tube under a G. E. sunlamp with periodic cooling. The solution was poured into 200 parts of methanol. Since polyacrylic acid is soluble in wet methanol all ungrafted polyacrylic acid is unprecipitated. The precipitate which contains the graft polymer dissolved in 100 parts water to give a clear solution evidencing the fact that it is not a mixture of two homopolymers. Infrared examination showed this to contain 47 mole percent polyacrylic acid and 53 mole percent polyacrylamide.

Example 3

6 parts of polymethyl acrylate containing 1.5% of copolymerized α-chloroacrylonitrile is dissolved in 40 parts of benzene. 10 parts of styrene is added and the mixture is exposed, in quartz tubes, to the radiation from a G. E. sunlamp for 2 hours. The product is poured into methanol. This solvent holds in solution any ungrafted polymethyl acrylate but precipitates graft polymer and polystyrene. The precipitate is dissolved in methyl, ethyl, ketone and 3 times its volume of methanol is added. A small amount of precipitate (unattached polystyrene) is discarded and the supernatant liquid which contained the graft polymer is evaporated. The graft polymer contained 25 mole percent polystyrene and 75 mole percent polymethyl acrylate as determined by infrared examination.

Example 4

The procedure of Example 3 is repeated with the exception that methylstyrene is employed instead of styrene as the monomer grafted to the backbone polymer. The graft copolymer contained approximately 24 mole percent polymethylstyrene and 76 mole percent polymethyl acrylate.

The process of the present invention is of particular advantage in the formation of graft copolymers such as in grafting: polyacrylamide to polyacrylonitrile; polyacrylonitrile to polyacrylamide; polyacrylic acid to polyacrylamide; polystyrene or polymethylstyrene to polymethylacrylate; polyacrylonitrile to polymethylacrylate; polyvinyl pyridine to polyacrylonitrile; polyvinyl acetate to polymethylacrylate, and the like.

I claim:

1. A process for preparing graft copolymers which comprises preparing a backbone polymer by polymerizing in the presence of α-chloroacrylonitrile, a monomer selected from the group of compounds having the general formulas

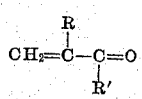

and

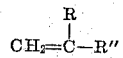

wherein R is a substituent selected from the group consisting of hydrogen and —CH$_3$ and —C$_2$H$_5$ radicals, R' is a substituent selected from the group consisting of hydrogen, —NH$_2$ —OH, —OCH$_3$ and —OC$_2$H$_5$ radicals and R'' is a substituent selected from the group consisting of

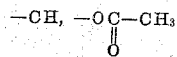

and

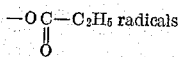

said α-chloroacrylonitrile being present in amounts of from about 0.1% to 5% based on the weight of said monomers; dissolving the resulting backbone polymer, together with a dissimilar monomer to be used to make the graft, in a suitable solvent; and generating free radicals by photolyzing the solution of chlorine containing backbone polymer and dissimilar monomer thereby grafting said dissimilar monomer on said backbone polymer, said dissimilar monomer being selected from the group of polymerizable monomers containing a CH$_2$=C< group and a boiling point of at least 60° C.

2. A process for preparing graft copolymers which comprises preparing a backbone polymer by polymerizing in the presence of α-chloroacrylonitrile, acrylamide, said α-chloroacrylonitrile being present in amounts of from about 0.1% to 5% based on the weight of said acrylamide; dissolving the resulting backbone polymer together with a dissimilar monomer to be used to make the graft, in a suitable solvent; and generating free radicals by photolyzing the solution of chlorine containing backbone polymer and dissimilar monomer thereby grafting said dissimilar monomer on said backbone polymer, said dissimilar monomer being selected from the group of polymerizable monomers containing a CH$_2$=C< group and a boiling point of at least 60° C.

3. A process for preparing graft copolymers which comprises preparing a backbone polymer by polymerizing in the presence of α-chloroacrylonitrile, acrylonitrile, said α-chloroacrylonitrile being present in amounts of from about 0.1% to 5% based on the weight of said acrylonitrile; dissolving the resulting backbone polymer, together with a dissimilar monomer to be used to make the graft, in a suitable solvent; and generating free radicals by photolyzing the solution of chlorine containing backbone polymer and dissimilar monomer thereby grafting said dissimilar monomer on said backbone polymer, said dissimilar monomer being selected from the group of polymerizable monomers containing a CH$_2$=C< group and a boiling point of at least 60° C.

4. A process for preparing graft copolymers which comprises preparing a backbone polymer by polymerizing in the presence of α-chloroacrylonitrile, methylacrylate, said α-chloroacrylonitrile being present in amounts of from about 0.1% to 5% based on the weight of said methylacrylate; dissolving the resulting backbone polymer, together with a dissimilar monomer to be used to make the graft, in a suitable solvent; and generating free radicals by photolyzing the solution of chlorine containing backbone polymer and dissimilar monomer thereby grafting said dissimilar monomer on said backbone polymer, said dissimilar monomer being selected from the group of polymerizable monomers containing a CH$_2$=C< group and a boiling point of at least 60° C.

5. A process for preparing graft copolymers which comprises preparing a backbone polymer by polymerizing in the presence of α-chloroacrylonitrile, a monomer selected from the group of compounds having the general formulas

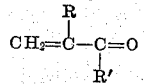

and

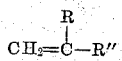

wherein R is a substituent selected from the group consisting of hydrogen and —CH$_3$ and —C$_2$H$_5$ radicals, R' is a substituent selected from the group consisting of hydrogen, —NH$_2$, —OH, —OCH$_3$ and —OC$_2$H$_5$ radicals and R'' is a substituent selected from the group consisting of

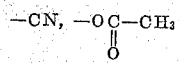

and

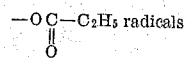

said α-chloroacrylonitrile being present in amounts of from about 0.1% to 5% based on the weight of said monomers; dissolving the resulting backbone polymer, together with acrylic acid to be used to make the graft, in a suitable solvent; and generating free radicals by photolyzing the solution of chlorine containing backbone polymer and acrylic acid thereby grafting said acrylic acid on said backbone polymer.

6. A process for preparing graft copolymers which comprises preparing a backbone polymer by polymerizing in the presence of α-chloroacrylonitrile, acrylamide, said α-chloroacrylonitrile being present in amounts of from about 0.1% to 5% based on the weight of said acrylamide; dissolving the resulting backbone polymer, together with acrylic acid to be used to make the graft, in a suitable solvent; and generating free radicals by photolyzing the solution of chlorine containing backbone polymer and acrylic acid thereby grafting said acrylic acid on said backbone polymer.

7. A process for preparing graft copolymers which comprises preparing a backbone polymer by polymerizing in the presence of α-chloroacrylonitrile, acrylonitrile, said α-chloroacrylonitrile being present in amounts of from about 0.1% to 5% based on the weight of said acrylonitrile; dissolving the resulting backbone polymer, together with acrylamide to be used to make the graft, in a suitable solvent; and generating free radicals by photolyzing the solution of chlorine containing backbone polymer and acrylamide thereby grafting said acrylamide on said backbone polymer.

8. A process for preparing graft copolymers which comprises preparing a backbone polymer by polymerizing in the presence of α-chloroacrylonitrile, a monomer selected from the group of compounds having the general formulas

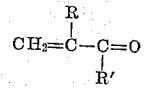

and

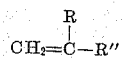

wherein R is a substituent selected from the group consisting of hydrogen and —CH$_3$ and —C$_2$H$_5$ radicals, R' is a substituent selected from the group consisting of hydrogen, —NH$_2$, —OH, —OCH$_3$ and —OC$_2$H$_5$ radicals and R" is a substituent selected from the group consisting of

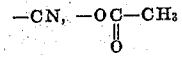

and

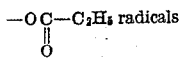

said α-chloroacrylonitrile being present in amounts of from about 0.1% to 5% based on the weight of said monomers; dissolving the resulting backbone polymer, together with a styrene monomer to be used to make the graft, in a suitable solvent; and generating free radicals by photolyzing the solution of chlorine containing backbone polymer and styrene monomer thereby grafting said styrene monomer on said backbone polymer.

9. A process for preparing graft copolymers which comprises preparing a backbone polymer by polymerizing in the presence of α-chloroacrylonitrile, a monomer selected from the group of compounds having the general formulas

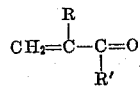

and

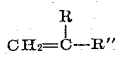

wherein R is a substituent selected from the group consisting of hydrogen and —CH$_2$ and —C$_2$H$_5$ radicals, R' is a substituent selected from the group consisting of hydrogen, —NH$_2$, —OH, —OCH$_3$ and —OC$_2$H$_5$ radicals, and R" is a substituent selected from the group consisting of

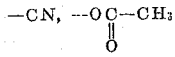

and

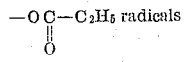

said α-chloroacrylonitrile being present in amounts of from about 0.1% to 5% based on the weight of said monomers; dissolving the resulting backbone polymer, together with a methylstyrene monomer to be used to make the graft, in a suitable solvent; and generating free radicals by photolyzing the solution of chlorine containing backbone polymer and methylstyrene monomer thereby grafting said methylstyrene monomer on said backbone polymer.

10. The process of claim 8 in which the compound of the general formulas is methylacrylate.

11. The process of claim 8 in which the compound grafted is a member selected from the group consisting of vinyl pyridine, methyl vinyl pyridine, and ethyl vinyl pyridine.

12. A process for preparing a graft copolymer which comprises dissolving in a suitable solvent a backbone polymer containing α-chloroacrylonitrile, said backbone polymer being the polymer of a compound selected from the group having the general formulas:

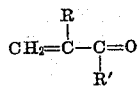

and

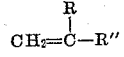

wherein R is a substituent selected from the group consisting of hydrogen and —CH$_3$ and —C$_2$H$_5$ radicals, R' is a substituent selected from the group consisting of hydrogen, —NH$_2$, —OH, —OCH$_3$ and —OC$_2$H$_5$ radicals and R" is a substituent selected from the group consisting of

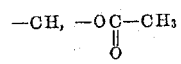

and

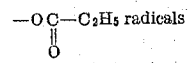

said α-chloroacrylonitrile being present in amounts of from about 0.1% to 5% based on the weight of said monomers, together with a dissimilar monomer to be grafted and generating free radicals by photolyzing the solution of chlorine containing backbone polymer and dissimilar monomer thereby grafting said dissimilar monomer on said backbone polymer, said dissimilar monomer being selected from the group of polymerizable monomers containing a CH$_2$=C< group and a boiling point of at least 60° C.

13. A process for preparing a graft copolymer which comprises dissolving in a suitable solvent a backbone polymer of acrylamide containing α-chloroacrylonitrile, said α-chloroacrylonitrile being present in amounts of from about 0.1% to 5% based on the weight of acrylamide, together with a dissimilar monomer to be grafted and generating free radicals by photolyzing the solution of chlorine containing backbone polymer and dissimilar monomer thereby grafting said dissimilar monomer on said backbone polymer, said dissimilar monomer being selected from the group of polymerizable monomers containing a CH$_2$=C< group and a boiling point of at least 60° C.

14. A process for preparing a graft copolymer which comprises dissolving in a suitable solvent a backbone polymer of acrylonitrile containing α-chloroacrylonitrile, said α-chloroacrylonitrile being present in amounts of from about 0.1% to 5% based on the weight of acrylonitrile together with a dissimilar monomer to be grafted and generating free radicals by photolyzing the solution of chlorine containing backbone polymer and dissimilar monomer thereby grafting said dissimilar monomer on said backbone polymer, said dissimilar monomer being selected from the group of polymerizable monomers containing a CH$_2$=C< group and a boiling point of at least 60° C.

References Cited in the file of this patent

UNITED STATES PATENTS 2,666,025    Nozaki _____ Jan. 12, 1954